Feb. 2, 1971 R. E. BIDDICK 3,560,264
FUEL CELL WITH ELECTROLYTE OR FUEL DISTRIBUTOR
Original Filed Nov. 4, 1964 2 Sheets-Sheet 1
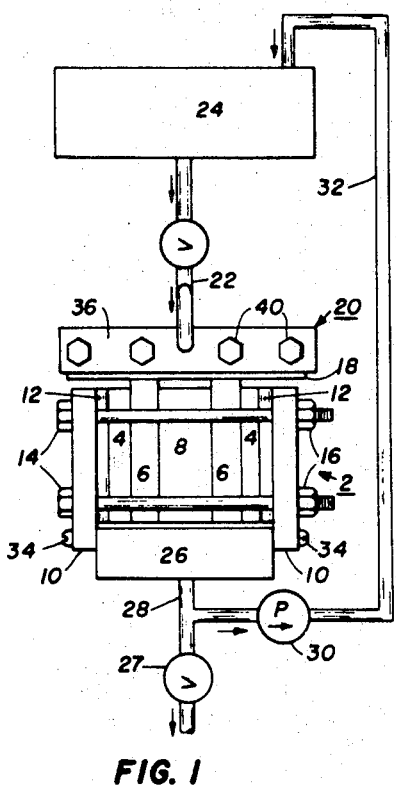
FIG. 1
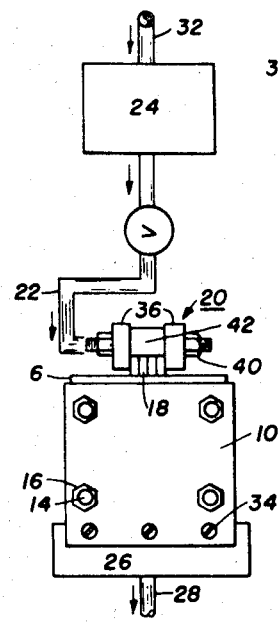
FIG. 2
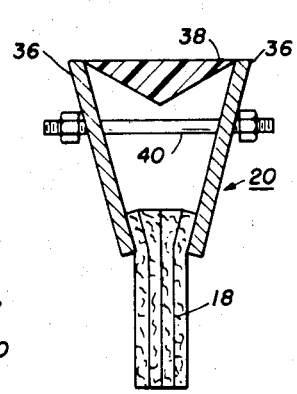
FIG. 3
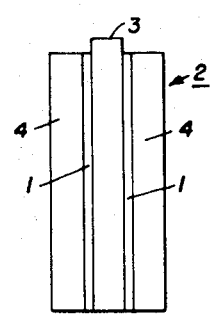
FIG. 1A
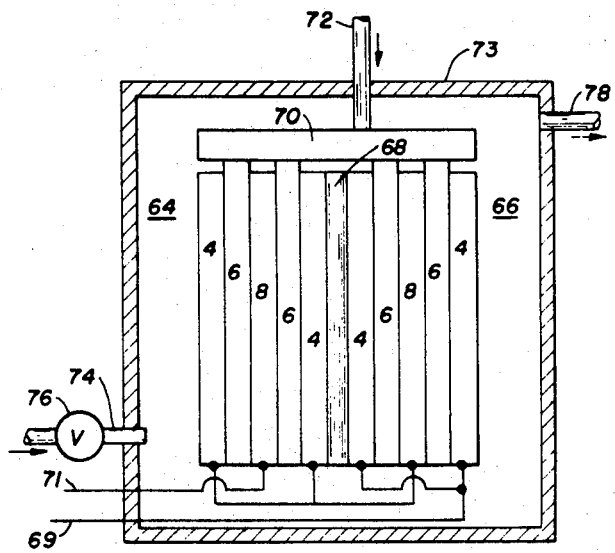
FIG. 4
FIG. 4A
INVENTOR.
ROYCE E. BIDDICK
BY Milton W. Lee
ATTORNEY.

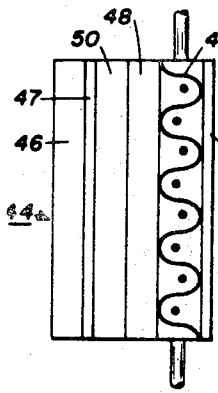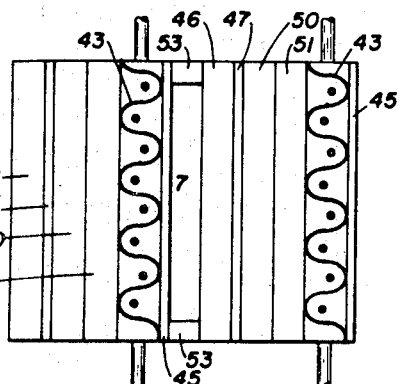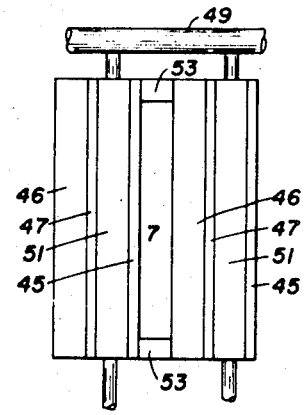
FIG. 5  FIG. 5A  FIG. 5C
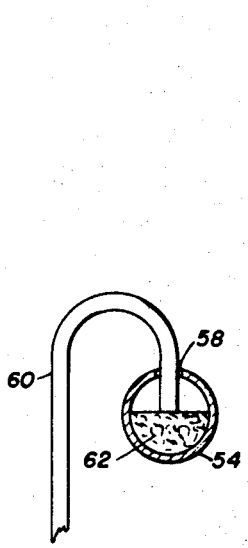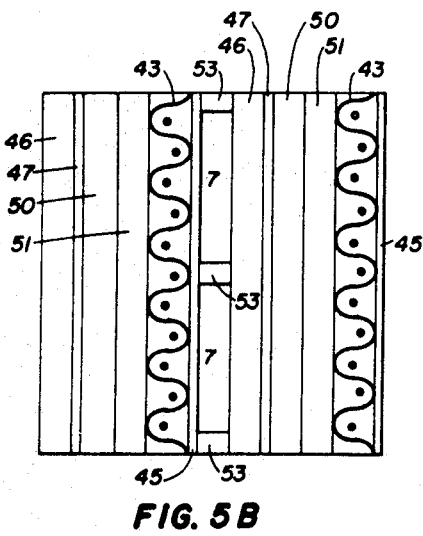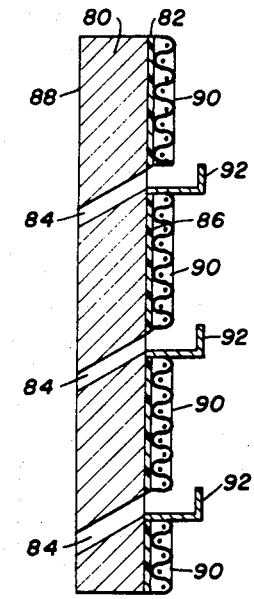
FIG. 7  FIG. 5B  FIG. 8
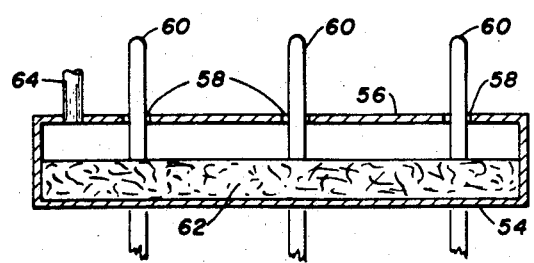
FIG. 6

3,560,264
FUEL CELL WITH ELECTROLYTE OR FUEL DISTRIBUTOR

Royce E. Biddick, Edina, Minn., assignor, by mesne assignments, to Union Oil Company of California, Los Angeles, Calif., a corporation of California
Original application Nov. 4, 1964, Ser. No. 408,909, now Patent No. 3,475,222, dated Oct. 28, 1969. Divided and this application May 9, 1968, Ser. No. 738,747
Int. Cl. H01m 27/12, 7/00; B67d 3/00
U.S. Cl. 136—86          5 Claims This is a division of application Ser. No. 408,909, filed Nov. 4, 1964, now Pat. No. 3,475,222 granted Oct. 28, 1969.

This invention relates to an apparatus for the electrochemical oxidation of an organic fuel in a process wherein electrical energy is a product of such oxidation. More specifically this invention is directed to a novel fuel cell, to a type of fuell cell system wherein efficient electrolyte and fuel distribution is obtained and to novel electrode structures.

In recent years fuel cells have received considerable attention in the continuing quest for improved sources of electrical energy. A fuel cell is an electrochemical device in which part of the energy of a chemical reaction is converted directly into direct current electrical energy. One of the most significant advantages of fuel cells over conventional methods of generating electricity is the directness by which chemical energy is converted into electrical energy. This direct conversion of energy eliminates the necessity of converting energy into heat. Other advantages of fuel cells are quietness, cleanliness, and the reduction or complete elimination of moving parts.

In general the fuel cell electrochemically generates electricity by deriving electrical energy from a chemical reaction maintained by a continuous supply of a different reactant in effective proximity to each of two electrodes disposed in spaced relationship in an electrolyte. According to one theory of the operation of a typical fuel cell utilizing an aqueous alkaline solution as the electrolyte an oxidant is continuously introduced at the oxidant electrode (cathode) where it contacts the electrolyte and forms ions thereby imparting positive charges to the cathode. Simultaneously, a reductant is continuously introduced at the fuel electrode (anode) where it forms ions and leaves the anode negatively charged. The ions formed at the respective electrodes migrate in the electrolyte and unite while the electrical charges imparted to the electrode are utilized as electrical energy by connecting an external circuit across the electrodes. For example, in the case of an oxygen-hydrogen fuel cell the hydroxyl ions that are formed at the cathode and the hydrogen ions that are formed at the anode migrate across the aqueous alkaline electrolyte and unite to form water.

The classification of the fuel cell reactants as oxidants and the reductants is made on the basis of the electron donor and electron acceptor characteristics of the reactants in any given system. Illustrative of reactants which have been heretofore proposed or used are oxidants such as pure oxygen; oxygen-containing gases, e.g., air; halogens, e.g., chlorine; and reductants such as hydrogen, carbon monoxide, natural gas, methane, ethane, formaldehyde, and methanol.

The electrolyte of the fuel cell serves as the electrochemical connection between the electrodes and is required to prevent transfer of the reactants away from their respective electrodes where the formation of explosive mixtures can occur. The electrolyte utilized should not react directly to any appreciable extent with the reactants or reaction product formed during the operation of the fuel cell, and it must permit the migration of the ions formed during the operation of the fuel cell. Depending on the system under consideration, examples of electrolytes that can be utilized are aqueous solutions of strong bases, such as alkali metal hydroxides, aqueous solutions of acids, such as sulfuric acid and hydrochloric acid, aqueous salt electrolytes such as sea water, fused salt electrolytes, and ion-exchange membranes.

This type of conventional fuel cell, however, has usually required relatively high operating temperatures in the range of about 200° C. for optimum efficiency and inherently has necessitated that the vapor pressure of the electrolyte solution be relatively high. The construction of these cells to withstand the high pressures and temperatures involves considerable complications, operational hazards, and expenditures making it economically unattractive to use fuel cells in lieu of the commonly accepted sources of electrical energy such as the motor-driven generator and the storage battery. In addition because of the extreme sensitivity of these cells it has heretofore been necessary to employ a complicated system of control equipment to maintain the cell in as efficient operating state as possible. This complex system has ordinarily necessitated electrolyte and fuel pumps, complex distribution and feed means, fans to cool the fuel cell, and other attendant machinery.

The difficulties of these prior art apparatuses have now been overcome by means of the novel fuel cell structure and auxiliary equipment hereinafter disclosed whereby the operation of the fuel cell is made more efficient and economical wherein useful amounts of electrical energy can be produced without the need of attendant auxiliary equipment that has been heretofore necessary in the operation of conventional fuel cells. Accordingly the primary object of this invention is to provide a new electrochemical apparatus for generating electricity.

Another object of this invention is to provide a fuel cell capable of operating under ambient temperatures and pressures.

Another object of this invention is to provide a fuel cell system wherein the cell may be operated under unattended conditions for extended periods of time.

Another object of this invention is to provide a novel fuel cell structure wherein the oxidant is obtained from the ambient or surrounding atmosphere and the cell is operated under substantially atmospheric pressures.

Another object of this invention is the provision of a fuel cell structure wherein at least one anode and one cathode are separated by an absorbent separator, electrolyte is absorbed within the separator and the top and bottom of the cell structure is open to the ambient atmosphere whereby substantial pressure equalization is obtained between the top and bottom of said cell.

Another object of this invention is a fuel cell structure having at least two cathodes, two separators and one anode, wherein electrolyte is absorbed within either the separators or the anode; and at least the element absorbing the electrolyte communicates to the ambient atmosphere so that a static head of electrolyte does not build up within said element.

Another object of this invention is a fuel cell structure wherein a single anode is contained in an envelope formed by two cathodes.

Another object of this invention is to provide a low cost, reliable, gravity feed electrolyte and fuel distributor for a fuel cell.

Another object of this invention is to provide a novel type of electrode whereby the electrolyte penetrant of said electrode is conserved.

Another object of this invention is to provide a fuel cell cathode which will operate with air or oxygen at ambient pressures for a sustained period of time without loss of activity due to flooding.

Still a further object of this invention is to provide a fuel cell which will operate with gravity flow of fuel and electrolyte, utilizing the natural conduction of air thereby obviating the need for auxiliary equipment wherein the fuel cell has a long life without flooding of the air electrode.

These and further objects of this invention will become apparent or be described as the description herein proceeds and reference is made to the accompanying drawings in which;

FIG. 1 is a side view of the complete fuel cell system comprising the novel fuel cell structure and distributor of this invention;

FIG. 1A is a side view of an alternate embodiment of the cell structure illustrated in FIG. 1;

FIG. 2 is a front view of the apparatus depicted in FIG. 1;

FIG. 3 is a cross-sectional view of the distributor depicted in FIG. 2;

FIG. 4 is an alternate embodiment in partial cross-section showing schematically the wiring diagram and cell structure of a battery of the fuel cells depicted in FIG. 1;

FIG. 4A is a side view of a battery composite of the embodiment of FIG. 1A;

FIG. 5 is an alternate embodiment of the invention wherein gaseous fuel rather than a liquid fuel is utilized;

FIG. 5A is a side view of a battery composite of the apparatus of FIG. 5;

FIG. 5B is a top view of the apparatus of FIG. 5A;

FIG. 5C is an alternate embodiment of FIG. 5 represented in battery configuration;

FIG. 6 is a side cross-sectional view showing the novel fuel and electrolyte distributor for use in a fuel cell apparatus;

FIG. 7 is an end cross-sectional view of the apparatus depicted in FIG. 6;

FIG. 8 is a highly magnified, over simplified end view of the novel type of electrode useful in the fuel cells of this invention.

Referring specifically to FIG. 1, there is depicted for reasons of simplicity and clarity, a single unitary cell structure 2 consisting of a sandwich of members comprising cathodes 4 which may be compounded or fabricated as are any of the cathodes in the prior art but preferably are cathodes fabricated in a manner and of materials herein later described. Adjacent to each cathode are porous separators 6 substantially coextensive with cathodes 4, but preferably extending beyond the upper and lower edges of cathodes 4 and anode 8, which anode may be any of the anodes known in the art such as metal sheet coated with platinum black. The sandwich assembly comprising the members 4, 6, and 8 are held in fixed position relative to each other by means of end pieces 10 which may be of a plastic substantially inert material such as "Lucite." Disposed between end pieces 10 and cathodes 4 are vertical spacer separator rods 12 fashioned of an inert material such as polyvinyl chloride such that the surfaces of cathodes 4 opposite end pieces 10 has as great an exposed surface area to the ambient atmosphere as possible. Through bolts 14 cooperating with nuts 16 provide means whereby the sandwich of members are held in fixed rigid relationship. Preferably the exterior side or lateral surfaces, as opposed to the top and bottom surfaces formed by the sandwich of members 4, 6, and 8, have a fluid impermeable coating which may be any of the normal type of waterproof glues, adhesives or resins such as epoxies or solutions of plastics in volatile solvents which are inert to electrolytic solutions, the choice of the sealant being dependent upon whether an acidic or basic electrolyte is utilized. The upper and lower edges of the sandwich members are fluid permeable with the upper and lower ends of separators 6 preferably extending beyond the upper and lower edges of cathodes 4 and anode 8. The projecting upper end of separators 6 contact absorbent element 18 made up of a plurality of sheet-like layers of a non-woven fabric such as "Viskon" which layers are retained in trough-like member 20 which acts as an intermediate reservoir for a fuel and electrolyte mixture, not shown, fed to intermediate reservoir 20 by valved conduit 22. Conduit 22 communicates to electrolyte and dissolved fuel reservoir 24 supported above intermediate fuel electrolyte distributor 20 by supports not shown. Spent fuel and electrolyte container 26 is positioned below the sandwich of members 4, 6, and 8 and communicates through valved conduit 28 and pump 30 to conduit 32 terminating in electrolyte and dissolved fuel reservoir 24. Alternatively valve 27 may be opened to purge all of the spent fuel and electrolyte solution from the system.

Referring to FIG. 1A fuel cell structure 2 is alternatively composed of cathodes 4, semifluid impermeable ion-conducting separators 1, fashioned of a material such as ion exchange resins and ion permeable membranes, in juxtaposition to porous anode. Anode 3 is absorbent and sufficiently porous to retain a liquid solution of electrolyte and fuel within its pores for a time sufficient to permit electrochemical reaction. The anode 3 communicates to the atmosphere at its top and bottom so than an electrolyte-fuel static head is not created within the anode.

Referring to FIG. 2 spent electrolyte and fuel receptacle 26 is secured to end pieces 10 by means of screws 34. From FIGS. 1 and 2 in conjunction with FIG. 3 the structural features of fuel and electrolyte distributor 20 are readily apparent. Fuel and electrolyte distributor 20 comprises a pair of contiguous side wall members 36 with fulcrum element 38 preferably located at the upper edges of side wall members 36 with side wall members 36 brought to bear against fulcrum 38 and absorbent material 18 by means of through bolts 40. The end wall members of distributor 20 comprise resilient packing material 42 such as rubber, elastomer or impregnated asbestos, etc., which materials are substantially fluid impervious. It can be seen that change in compressive force caused by tightening or loosening bolt 40 of distributor 20 varies the volume of distributor 20 and also causes plates 36 to impinge upon absorbent material 18 restricting fluid conductivity of absorbent material 18.

In the operation of this fuel cell system it is only necessary to place an electrolyte such as 6 M potassium hydroxide and 5 M methanol solution in reservoir 24, opening the valve in conduit 22 to allow the fuel electrolyte solution to flow into distributor 20 thereby causing absorbent element 18 to become saturated with the fuel-electrolyte solution. Since absorbent element 18 is in contact with absorbent separators 6 or absorbent porous anode 3 the fuel-electrolyte solution, due to gravity and capillary action, tends to completely saturate separators 6 or porous anode 3 with the fuel-electrolyte mixture thereby furnishing electrolyte and fuel to the necessary surfaces of cathodes 4 and anode 8 or in the alternate embodiment to anode 3. The ambient atmosphere, in which the fuel cell is placed, furnishes the necessary oxidant to the exposed surfaces of cathodes 4 thereby initiating an electrochemical process wherein electricity is generated and withdrawn from the cathodes and anode by conducting means not shown. Electrical conductors from the cathodes and a conductor from the anode provide leads by which current may be withdrawn. As the spent electrolyte-fuel solution passes through absorbent separators 6 or absorbent porous anode 3 it drips into receptacle 26 from whence it can be purged from the system or recirculated to reservoir 24.

It will be readily apparent to those skilled in the art that many modifications can be made in the afore-described apparatus without departing from the scope of the disclosed invention. For instance the sandwich of members constituting the fuel cell structure may be assembled by gluing together along the lateral or side edges the plurality of elements and then clamping the cell between two end members to afford rigid stability to the cell structure. Many modifications of an equivalent mechanical nature may be improvised to afford the necessary structural stability to the fuel cell structure and will not be delved in here since such modifications are within the engineering skill of those familiar with the fuel cell art. Similarly, the means for supporting, fastening and otherwise connecting the apparatus to other auxiliary equipment are not considered as matters within the scope of this invention. The type of absorbent separator may be fabricated from any of the known absorbent materials which are inert under the conditions in which they are to be used. Examples of such materials are asbestos, gypsum, "Celite," silica gel, non-woven synthetic fabrics, regenerated cellulose, porous plastics, porous rubber, and glass mat. Additionally, the electrolyte; the actual physical dimensions, mode of fabricating the electrodes, and the components making up said electrodes, are not claimed as criticalities in that the disclosures already present in the prior art are adaptable to the novel type of fuel cell structures, electrolyte-fuel distributor and operating conditions heretofore described.

A fuel cell similar to that pictured in FIG. 1 was constructed wherein the physical dimension of the overall cell was 2" by 2". The anode was 0.020" sintered nickel containing a paladium catalyst of a density of approximately 18 milligrams/cm.$^2$. The cathodes were prepared by applying $Ag_2O$ and "Teflon" solids to a 40 mesh nickel screen and then treating the air side with an additional amount of "Teflon" to render it more hydrophobic. The total weight of $Ag_2O$ catalyst was 36 mg./cm.$^2$. The The electrolyte comprised a solution of 6 M KOH and 5 M $CH_3OH$, which solution was supplied to the top of the separators by gravity feed through a distributor means.

Oxidant supply means was by way of ambient atmosphere and circulation of the oxidant was obtained by natural convection. The cell delivered 1 ampere of current at 0.37 volt, at a temperature of about 40° C. The fabrication and the construction of the cathode has not been described in detail, since the disclosed novel fuel cell structure is not dependent, for practical purposes, upon either any one electrode construction or mode of preparation or the type and concentration of the fuel-electrolyte solution. Other known cathodes, anodes, catalysts, fuels and electrolytes will suffice, it being only necessary that compatibility, known in the art, be present.

Referring to FIG. 4 there is shown two of the cells, without supporting structure, as depicted in FIGS. 1 and 2. Two cell sandwich structures 64 and 66 are in spaced relationship with each other with vertical spacer rods 68 maintaining this fixed relationship. Separators 6 project above the upper surfaces of the cathodes 4 and anodes 8 and are in contact with fuel distributor means 70 fed by inlet pipe 72 by which separators 6 are able to absorb electrolyte and fuel solution throughout the extent of their structures, the solution flowing downwardly due to gravitational forces. Enclosure 73 fabricated of plastic, glass, metal, etc. has oxidant fuel intake conduit 74, with butterfly control valve 76 disposed therein, open either to the atmosphere or connected to some other oxidant gas supply means. The oxidant gas admitted through conduit 74, when the ambient atmosphere is the oxidant gas supply means, is circulated within the confines of vessel 73 by natural connection from whence it leaves vessel 73 through exit outlet 78, the desired flow of oxidant gas being regulated by butterfly valve 76. While the electrical conductors 71 and 69 provide means by which electrical current can be withdrawn from the battery, and the individual cells are shown electrically connected or wired in series, it is readily apparent that the cells may be electrically wired in parallel and other means utilized for efficiently withdrawing the generated energy from the battery of fuel cells.

FIG. 4A illustrates an alternate battery configuration wherein cathodes 4 are juxtaposed to fluid-impermeable, ion-conducting separators 1. Anode 3 is absorbent and sufficiently porous to retain a liquid solution of electrolyte and fuel within its pores for a time sufficient to permit electrochemical reaction. Spacers 5 spaced between each of adjacent cathodes 4, of the two cells, form space 7 whereby sufficient surface areas of cathodes 4 are exposed to efficiently utilize the oxidant gas flowing through space 7. The operation of the cell is similar to that heretofore described except that the electrolyte and fuel solution is fed to porous anodes 3 rather than the absorbent separators as heretofore described. The electrical means to withdraw the generated current is identical to that described for the apparatus depicted in FIG. 4. Spacers 5 are fashioned of a dielectric material such as glass, porcelain, polyvinyl chloride and similar materials. The size and shape of spacers 5 are not critical it being only important that they permit as great a surface area exposure of cathodes 4 as possible consistent with effective space utilization engineering principles.

Referring to FIG. 5, there is schematically illustrated a gaseous reductant type of fuel cell 44 comprising a cathode 46 and porous anode 48 being separated by absorbent separator 50. Adjacent to anode 48 is fluid impermeable plate 52 which prevents a fuel, such as hydrogen, fed to anode 48, from escaping from the fuel gas chamber, in which is contained corrugated screen support 43 which serves as a spacer. Preferably, but not necessarily, semi-fluid impermeable ion-conducting membrane 47 is provided between cathode 46 and separator 50 to prohibit the gaseous fuel from passing through separator 50 to cathode 46. Separator 50 is in contact with an electrolyte distributor (not shown) as hereinbefore or hereafter described. Cathode 46 has its exposed surface in proximity to an oxidant gas supply such as the ambient atmosphere. The lateral edges preferably are covered with a layer of fluid impermeable material, (except provision is made for entrance of the electrolyte at the top of separator 50, and drainage of the electrolyte at the bottom of separator 50), such that an electrolyte such as 6 M KOH and the hydrogen gas fuel will not dissipate therethrough. A fuel cell constructed in this manner yielded a current of 0.1 ampere at 0.65 volt at a current density of 25 ma./cm.$^2$ for a period of 100 hours.

FIGS. 5A and 5B schematically illustrate a battery composite of the structure depicted in FIG. 5. Porous anodes 51 are adjacent a fuel gas chamber, the wall of which is plate 45, and within which is a corrugated wire screen spacer 43. Air access to cathode 46 is provided by air spacer 53. Ideally, but not necessarily semi-fluid impermeable membrane 47 is provided between absorbent separator 50, to which liquid electrolyte is fed, and cathode 46 to prevent the gaseous fuel from passing through the separator 50 and contacting cathode 46. In this embodiment an electrically wired cell, in series, is provided by electrically conducting spacer members 53 which permits the sandwiching of as many individual cells as desired, electrically conducting wire screen spacer 43 and fluid impermeable plate 45 providing the necessary conducting paths. It is obvious that other conducting means may be utilized in lieu of screen 43. Spacer members 53, in contact with juxtaposed cathode 46 and plate 45 may be fabricated from any of the well-known electrical conductors provided they are corrosion resistant. Their size and shape ideally should permit as great a surface exposure area of cathode 46 as possible so that oxidant gas passing through space 7 will be readily absorbed into the exposed surface of cathode 46; wire screens like spacers 43 are also suitable. Alternatively spacer member 53 may be a dielectric in which case the cells may be electrically wired in parallel or series by conventional means.

Alternatively, the anode 51, as depicted in FIG. 5C, may be so fabricated to permit the feeding thereto of a solution of electrolyte and dissolved fuel through a common header such as conduit 49 or through the distributor depicted in FIG. 6. In this embodiment the separator is a semi-fluid impermeable ion-conducting membrane 47. No fuel nor electrolyte compartment is required since the pores of the anode contain the fuel-electrolyte solution. Spacer members 53, between the cells may be electrically conducting whereby series connection of the cells, comprising the battery, is achieved. If members 53 are dielectric the individual cells may be connected in parallel by conventional means. Again, where the porous anode is adjacent an air space, such as 7, the exposed surface of the anode must be fluid impermeable to prohibit the escape of electrolyte and fuel into space 7. For example, if the anode is porous sintered nickel impregnated with catalyst, a thin sheet 45 of nickel need only be pressed against the exposed surface.

The construction and fabrication of the absorbent, porous anodes to which a solution of electrolyte and dissolved fuel is fed are well known to those skilled in the art and will not be discussed herein, inasmuch as these matters are outside the scope of this invention. It is only important that the substrate, catalyst, porosity and absorbency of the electrode be sufficient to accomplish the disclosed ends while maintaining compatibility with the remainder of the system such as for example, the reductant, electrolyte and fuel cell structure.

Referring to FIGS. 6 and 7, an alternate embodiment of the fuel and/or electrolyte distributor (which may be used in any of the disclosed apparatus) is depicted which may be used in lieu of the distributor 20 depicted in FIGS. 1, 2, and 3. This distributor comprises conduit 54 having a plurality of planar apertures 58 aligned to correspond with fuel cell absorbent separators or absorbent porous anodes in its upper surface 56. These apertures 58 are of sufficient size to allow wick elements 60 to pass therethrough and preferably extend into the interior of conduit 54 in proximity to absorbent element 62 supported by the interior of conduit 54. With this type of fuel distributor, fuel is introduced to conduit 54 by means of inlet pipe 64 and the volume formed by conduit 54 acts as a reservoir for the fuel-electrolyte solution wherefrom it is siphoned by wicks 60 and thencely to the absorbent separators or anodes in the fuel cell structure. By the use of this type of distributor, the capillary action of the wicking material serves to provide an even distribution of electrolyte and fuel flow to the fuel cell separators or anodes. While the distributor has been depicted as distributing a solution of electrolyte and dissolved fuel to the novel type of fuel cell illustrated in FIGS. 1 and 2, it may also be used for the novel type of fuel cell illustrated in FIG. 5, wherein only electrolyte solution is fed to an absorbent separator between the cathode and anode of said fuel cell structure. To prevent intercell shorting, when a battery of cells is utilized, the individual wicks 60 may terminate at a point spaced apart from the absorbent separator whereby the electrolyte and/or electrolyte-dissolved fuel solution drips onto the separators or the lengths of said wicks may be of sufficient length so as to increase the resistance of the path through which short circuiting may occur. While the wicks have here been depicted as open to the atmosphere, it is preferred to provide a non-conductive inert housing around such wicks to prevent undue evaporation of the electrolyte and/or electrolyte-dissolved fuel solution. The absorbent wicking material of wicks 60 and absorbent 62 may be fabricated of asbestos, "Dynel" fibers, non-woven synthetic fabrics, and other well-known absorbent chemically inert materials.

Referring to FIG. 8, there is depicted a novel type of electrode which may be utilized in the hereinbefore described fuel cell structures. The body of the electrode 80, which has been fabricated in accordance with any of the prior art knowledge, is provided with a hydrophobic coating 82 of a material such as polyfluorocarbon resin and has disposed throughout its cross section a plurality of passageways 84 which extend from the gas side 86 of the electrode 80 to the electrolyte side of the electrode 88. These passages, the number and size of which having been magnified and simplified to facilitate description, are of a sufficient size to allow electrolyte to pass therethrough from the gas side 86 to the electrolyte side 88 of the electrode. The electrode body 80 is necessarily a porous one through which electrolyte may slowly pass so as to facilitate an adequate three- phase contact of electrolyte, gaseous reactant and catalyst surfaces. Secured to hydrophobic layer 82 are drop collectors or wire mesh screens 90 of hydrophilic character which act as collectors for the droplets of electrolyte that form on hydrophobic layer 82. Loosely woven fabrics such as for example cheesecloth of resistant material may also be used as the drop collector 90 and flow downward due to gravitation to collecting cups or troughs 92, which collectors have a semi-conduit configuration having one wall extending sufficiently high to allow the level of accumulated electrolyte in said collectors to create a static head sufficient to force the electrolyte back through the electrode body 80 to the electrolyte side 88 of electrode 80. This type of electrode is ideally used where gas pressures are held at a minimum on the gas side of the electrode or where the oxidant supplied is at atmospheric pressures which pressures are insufficient to keep the electrolyte from channeling through the porous body 80 of the electrode. The size of the passageways is not critical and normally may be 0.001 to 0.1 inch in diameter and preferably are of the magnitude of about 0.01 inch. While a free standing electrolyte would force the electrolyte through the passageways rather than through the porous electrode body of a conventional cell structure, such is not the case in the disclosed novel cell. In the novel cell structure disclosed, the electrolyte does not build up a head because it is absorbed in the separator. The force of gravity merely causes the electrolyte to flow through the separator without building up a static head of free liquid. While electrolyte will penetrate through the pores of the electrode to the gas side of the electrolyte under the forces of capillary attraction and electroendosmosis, it will tend to build up in the form of droplets because of the hydrophobic layer 82 on the gas side surface of the electrode body 80. The electrolyte is prevented from flowing to the gas side of the electrode through the passageways 84 by the static head of liquid within the passageway 84 and in the troughs or weirs 92. No claim is made to the components of or method of fabricating the electrode body as the novelty claimed, namely the provision of collecting means and means of returning the electrolyte to the electrolyte side of the electrode, may be utilized in any of the gas electrodes known in the art. It will readily be apparent that dropwise collection of the electrolyte, rather than filmwise collection, once the electrolyte has penetrated the electrode body, will permit greater surface contact on the gas side of the electrode by an oxidant gas.

Although this invention has been described in relation to specific embodiments it will be apparent that modifications may be made by one skilled in the art without departing from the intended scope of this invention as defined by the appended claims.

The embodiments of the invention in which an exclusive property or privilege is claimed are defined as follows:

1. In combination an electrolyte and fuel distributor means and fuel cell comprising a plurality of electrodes separated by absorbent members, at least a portion of said plurality of electrodes having exposed surfaces and hydrophilic material secured in physical contact with said exposed surfaces whereby electrolyte collects on said hydrophilic material; said electrolyte and fuel distributor comprising a fluid impermeable closed-end conduit having a plurality of substantially co-planar apertures; a fluid absorbent element coextensive with and occupying at least a portion of the enclosure formed by said conduit, siphon-fluid conducting means extending through each of said apertures, one end of said siphon means contacting said fluid absorbent element, the other end of said siphon means adapted to communicate at least one of electrolyte and fuel to said absorbent members in said fuel cell; and means provided in said conduit through which at least one of electrolyte and fuel can be supplied thereto.

2. The apparatus of claim 1 wherein at least a portion of said exposed surfaces of said electrodes have a hydrophobic coating intermediate said exposed surfaces and said hydrophilic material for facilitating drop formation of said electrolyte on said hydrophobic coating and accumulation of the resultant drops on said hydrophilic material.

3. An apparatus in accordance with claim 2 wherein one of said electrodes has spaced passageways therethrough and means provided correlative to said passageways to contain said electrolyte penetrant above the level of said passageways whereby said electrolyte may accumulate thereby creating a static head sufficient to force said electrolyte back through said electrode.

4. The apparatus of claim 1 wherein said plurality of apertures in said conduit are positioned in the wall of said conduit most distant from said absorbent members and are aligned to coincide with said members, and said siphon fluid conducting means comprise wicks of absorbent material.

5. In combination a fuel cell comprising a plurality of electrodes separated by absorbent members and an electrolyte and fuel distributor comprising a fluid impermeable closed-end conduit having a plurality of substantially coplanar apertures; a fluid absorbent element coextensive with and occupying at least a portion of the enclosure formed by said conduit, siphon-fluid conducting means extending through each of said apertures, one end of said siphon means contacting said fluid absorbent element, the other end of said siphon means adapted to communicate electrolyte and fuel to said adsorbent members of said fuel cell, and means provided in said conduit for admitting electrolyte and/or fuel thereto.

References Cited

UNITED STATES PATENTS

| | | | |
|---|---|---|---|
| 600,719 | 3/1898 | Habermann | 136—162 |
| 2,942,053 | 6/1960 | Baldwin, Jr. et al. | 136—159 |
| 3,309,843 | 3/1967 | Rigopulos et al. | 136—86UX |
| 3,364,071 | 1/1968 | Kordesch | 136—162X |

ALLEN B. CURTIS, Primary Examiner

U.S. Cl. X.R.

136—162; 222—187